(12) United States Patent
Phelps (10) Patent No.: US 8,297,228 B2
(45) Date of Patent: Oct. 30, 2012

(54) FEED SUPPORT AND BALE RING MOVER FOR USE INSIDE A BALE RING

(76) Inventor: Corey Phelps, Murfreesboro, TN (US)

( * ) Notice: Subject to any disclaimer, the term of this patent is extended or adjusted under 35 U.S.C. 154(b) by 26 days.

(21) Appl. No.: 12/966,325

(22) Filed: Dec. 13, 2010

(65) Prior Publication Data

US 2011/0139078 A1    Jun. 16, 2011

Related U.S. Application Data

(60) Provisional application No. 61/286,121, filed on Dec. 14, 2009.

(51) Int. Cl.
*A01K 1/10* (2006.01)
(52) U.S. Cl. ........................................................ 119/60
(58) Field of Classification Search ............... 119/51.01, 119/51.03, 58, 60; 414/24.5, 24.6, 25, 800; 211/197
See application file for complete search history.

(56) References Cited

U.S. PATENT DOCUMENTS

| | | | |
|---|---|---|---|
| 816,595 A | 4/1906 | Peete | |
| 1,489,962 A | 4/1924 | Peal | |
| 1,691,293 A * | 11/1928 | Larson | 211/163 |
| 2,287,574 A | 6/1942 | Sikes | |
| 3,716,029 A * | 2/1973 | Pillsbury, Jr. | 119/701 |
| 4,088,094 A * | 5/1978 | Howard | 119/700 |
| 4,550,840 A * | 11/1985 | Van Deursen | 211/197 |
| 4,672,794 A * | 6/1987 | Good | 53/440 |
| 4,766,848 A * | 8/1988 | Rocco et al. | 119/701 |
| 5,280,841 A * | 1/1994 | Van Deursen | 211/197 |
| 5,323,734 A | 6/1994 | Meadows | |
| 5,829,461 A * | 11/1998 | Ramsey | 134/167 R |
| 6,698,596 B1 * | 3/2004 | Dean | 211/13.1 |
| 6,789,504 B1 | 9/2004 | O'Neill | |
| 6,951,189 B1 | 10/2005 | Lienemann | |
| 7,198,008 B2 * | 4/2007 | Poyner | 119/712 |
| 7,958,877 B2 * | 6/2011 | Lalor | 124/8 |

FOREIGN PATENT DOCUMENTS

| | | |
|---|---|---|
| CH | 667864 A5 | 11/1988 |
| RU | 2222187 C2 | 1/2004 |
| RU | 2231255 C2 | 6/2004 |

* cited by examiner

*Primary Examiner* — Rob Swiatek
*Assistant Examiner* — Ebony Evans
(74) *Attorney, Agent, or Firm* — PatentBest; Andrew McAleavey (57) ABSTRACT

A feed support for use with a bale ring, a system for feeding animals, and systems and methods for moving bale rings are disclosed. The feed support has a generally vertical support member, an attachment plate, and a plurality of telescoping arm assemblies that are mounted on the attachment plate for rotation. As mounted, the telescoping arm assemblies can rotate between an operational position in which they are generally horizontal and radiate outwardly from the attachment plate and a stored position, in which they extend perpendicular to the attachment plate. The arm assemblies have primary sections and secondary sections that are mounted within the primary sections for sliding, telescoping movement. Ends of the secondary arm sections may carry engaging structure for attaching to the bale ring. The feed support may allow the bale ring to be picked up and moved with a tractor or other equipment.

16 Claims, 9 Drawing Sheets

FIG. 9

FEED SUPPORT AND BALE RING MOVER FOR USE INSIDE A BALE RING

CROSS-REFERENCE TO RELATED APPLICATIONS

This application claims priority to U.S. Provisional Patent Application No. 61/286,121, filed Dec. 14, 2009. The contents of that application are incorporated by reference herein in their entirety.

BACKGROUND OF THE INVENTION

1. Field of the Invention

In general, the invention relates to structures for feeding livestock and other animals, and more particularly to a feed support for use inside a bale ring.

2. Description of Related Art

Bale rings are cylindrical structures that are used to contain animal feed, such as hay, to prevent the feed from being trampled or soiled, and to control the manner in which the feed is accessed by the animals. FIG. 1 of U.S. Pat. No. 6,951,189, which is incorporated by reference, illustrates a typical bale ring, or hay feeder, as it is sometimes called. The bale ring has a generally cylindrical shape, open at the top and bottom, and encloses a space into which a bale of hay may be placed. The upper portion of the bale ring has a series of slanted, vertically-extending slats around the entirety of its perimeter. Animals such as cattle can place their heads between the slats to feed, but are otherwise prevented from getting to the feed by the bale ring, and thus cannot trample or soil the feed.

Bale rings are typically made of metal, for example, aluminum or steel. Some bale rings come in several sections, which must be assembled prior to use. Because they act as a barrier for large, heavy animals, bale rings are often damaged or dented while in use, and are often significantly deformed by the animals seeking to feed on the hay. Oftentimes, a mildly or moderately deformed bale ring will remain in service.

While a typical bale ring protects the perimeter of a hay bale and prevents livestock from trampling it while feeding, it generally provides no barrier between the hay bale and the ground. Thus, ground moisture may seep into any hay stored within the bale ring and may thus spoil the hay.

The problem of hay spoilage due to ground moisture is an old one, and a number of solutions for it appear in the patent literature. For example, U.S. Pat. No. 816,595 to Peete, issued in 1906, discloses a "shock support" for supporting a shock of hay above ground level for curing purposes. However, the Peete shock support also exemplifies several of the difficulties with conventional solutions: it is not designed to work with a bale ring; it is large, cumbersome, and may be difficult to break down for shipping; and it would not be able to be used with a dented or otherwise deformed bale ring.

SUMMARY OF THE INVENTION

One aspect of the invention relates to a feed support for use with a bale ring. The feed support has an elongate, generally straight support member, an attachment plate, and a plurality of telescoping arm assemblies that are mounted on the attachment plate for rotation. As mounted, the telescoping arm assemblies can rotate between an operational position in which they are generally horizontal and radiate outwardly from the attachment plate and a stored position, in which they extend perpendicular to the attachment plate. The arm assemblies have primary sections and secondary sections that are mounted relative to the primary sections for sliding, telescoping movement. The arm sections may be comprised of square or rectangular tubing, and ends of the secondary arm sections may carry engaging structure for attaching to the bale ring.

As installed, the feed support supports feed within the bale ring above ground level. Because of the telescoping arm assemblies, the feed support may be used with bale rings of different sizes, and may also be used with bale rings that are dented or deformed.

Another aspect of the invention relates to a feed support and bale ring mover. The feed support has an elongate, generally straight support member, an attachment plate, and a plurality of telescoping arm assemblies that are mounted on the attachment plate for rotation. The support member may be open at both ends and have an open, axial channel therethrough, and the attachment plate may include a corresponding opening. As mounted, the telescoping arm assemblies can rotate between an operational position in which they are generally horizontal and radiate outwardly from the attachment plate and a stored position, in which they extend perpendicular to the attachment plate. The arm assemblies have primary sections and secondary sections that are mounted relative to the primary sections for sliding, telescoping movement. The arm sections may be comprised of square, rectangular, or round tubing, and ends of the secondary arm sections may carry engaging structure for attaching to the bale ring.

Other aspects of the invention pertain to methods of using the feed support and bale ring mover to move bales of animal feed. These methods generally involve using an assembly that includes a feed support and bale ring mover as installed in a bale ring. A spear mounted on a tractor can be inserted through the support member and attachment plate to move the assembled support and bale ring mover. Such assemblies can be used when oriented either horizontally or vertically.

Other aspects, features, and advantages of the invention will be set forth in the description that follows.

BRIEF DESCRIPTION OF THE DRAWING FIGURES

The invention will be described with respect to the following drawing figures, in which like numerals represent like features throughout the drawings, and in which.

DETAILED DESCRIPTION

Figure 1:
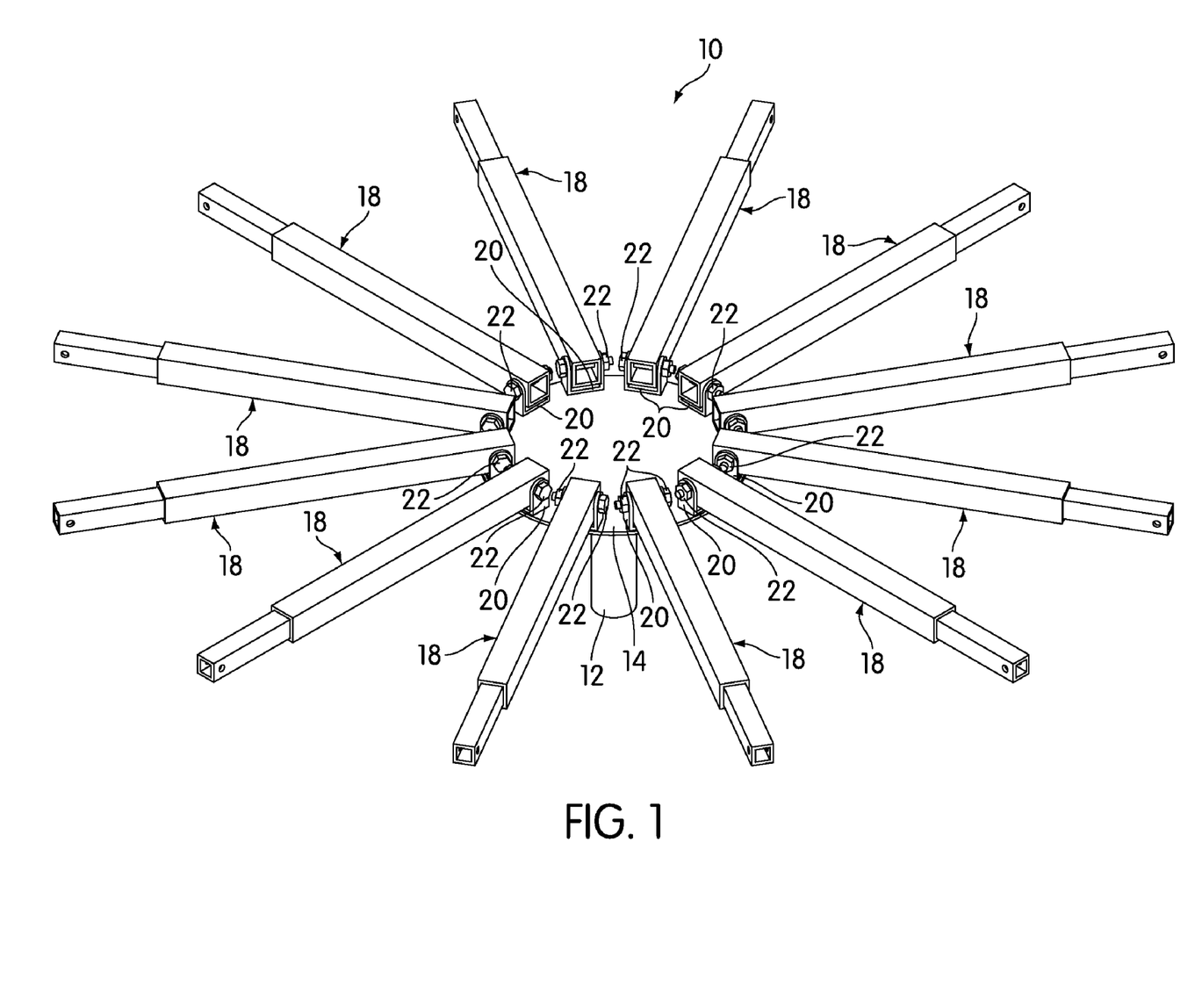
FIG. 1 is a perspective view of a feed support according to one embodiment of the invention.
Figure 2:
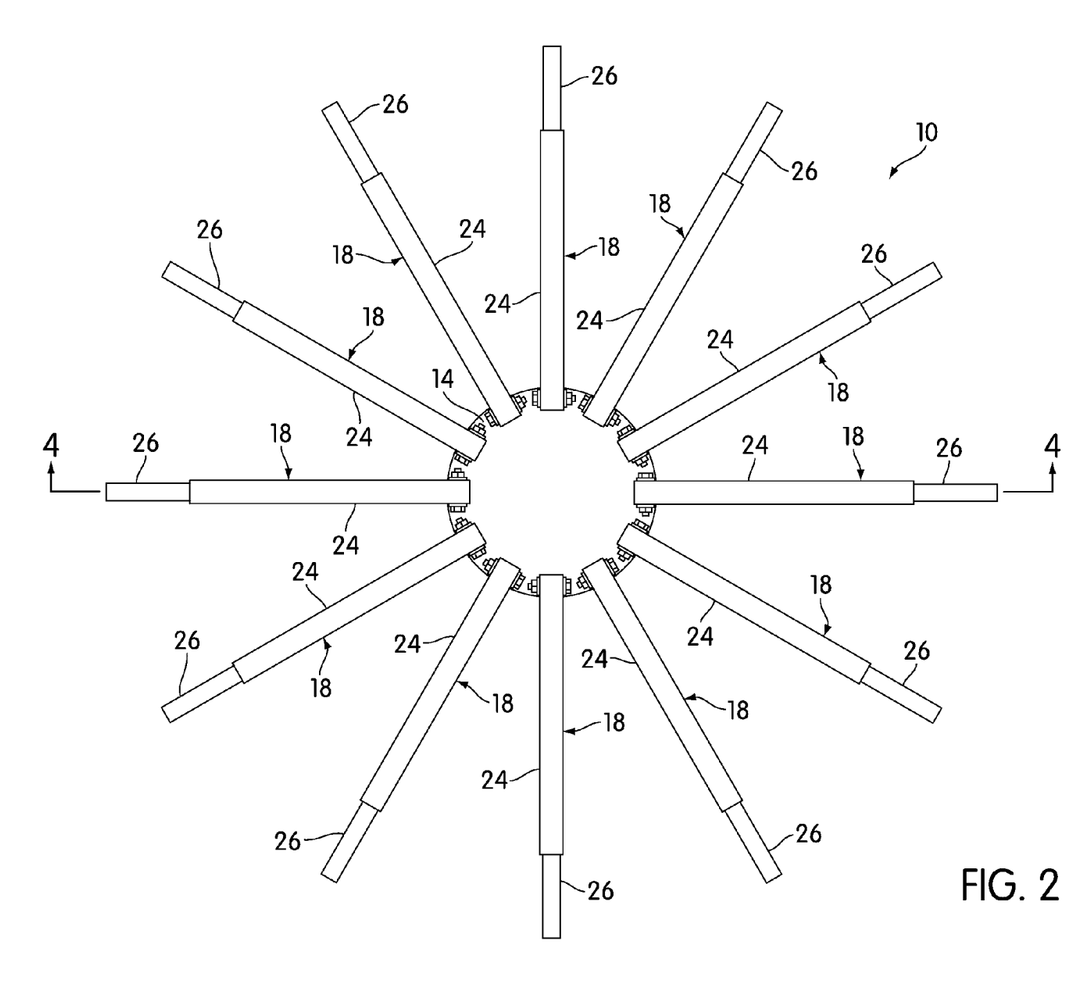
FIG. 2 is a top plan view of the feed support of FIG. 1.
Figure 3:
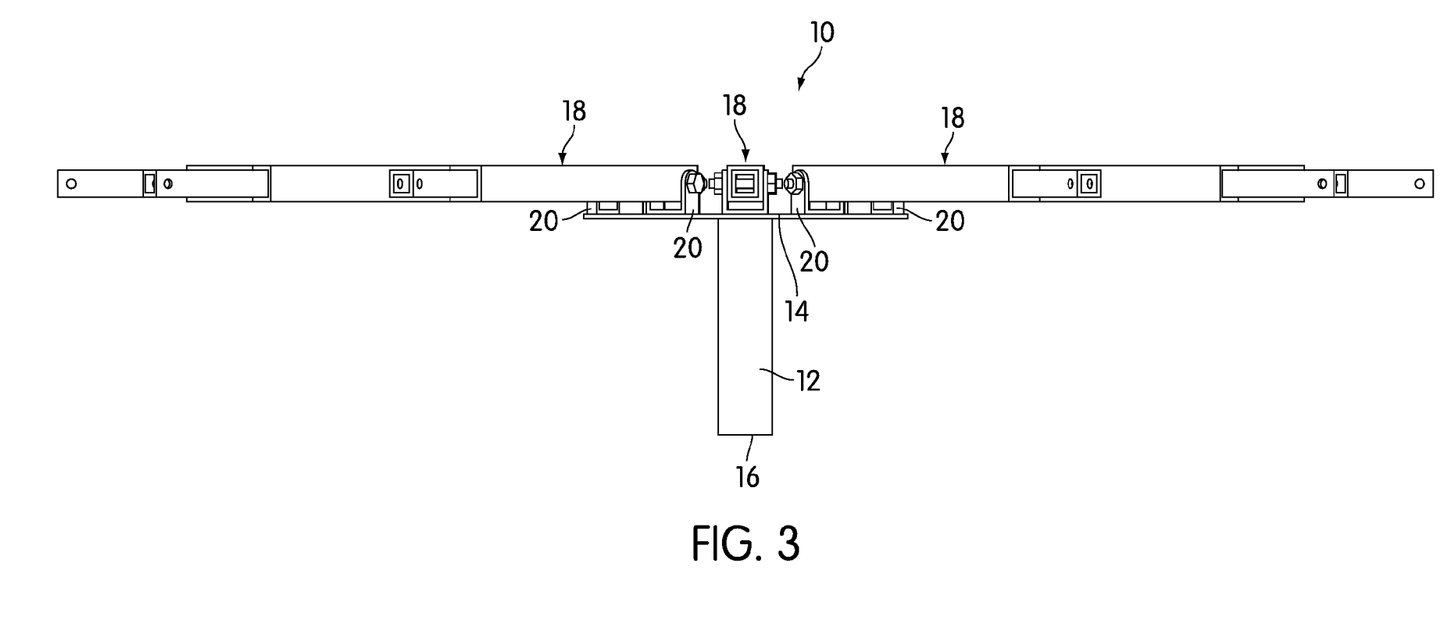
FIG. 3 is a side elevational view of the feed support of FIG. 1.

FIG. 1 is a perspective view of a feed support, generally indicated at 10, according to one embodiment of the invention, and FIGS. 2 and 3 are top plan and side elevational views, respectively, of the feed support 10. The feed support 10 includes a generally vertical support member 12, mounted at the top center of which is an attachment plate 14.

The support member 12 of the illustrated embodiment is a cylindrical member that may, for example, be comprised of a section of heavy metal pipe, although the support member may have any outer or cross-sectional shape in other embodiments of the invention. In a typical installation, the lower end 16 of the support member 12 would be driven into the ground or permanently fixed to a stable, immobile base structure so as to provide support and stability for the feed support 12. If hollow, the interior of the support member 12 may be configured to accept an adapter to allow it to be attached to a base. The support member 12 may have, for example, a length of about 1 foot.

The attachment plate 14 is generally circular, although it may have essentially any shape, and may be comprised of, for example, an aluminum or steel plate. As shown, the plate 14 is fixedly attached to the upper end of the support member 12. In one embodiment, the attachment plate 14 may have a diameter of about 1.5 feet. As will be described below in more detail, in some embodiments, particularly if the support member 12 is hollow, the attachment plate 14 may have a hole at its center, thus providing a continuous, open channel through the support member 12 and attachment plate 14.

Arrayed around the perimeter of the attachment plate 14 are a number of extending arm assemblies 18. Each of the arm assemblies 18 is attached to the attachment plate 14 such that it can pivot between an extended position depicted in FIGS. 1-3 and a retracted, stowed position that will be described in more detail below. More particularly, a plurality of U-shaped brackets 20 are fixed to the attachment plate 14. The upwardly-extending portions of each bracket 20 have a pair of aligned holes, and a bolt 22 passes through both the bracket 20 and the corresponding arm assembly 18, acting as a generally horizontal axis of rotation and mounting the arm assembly 18 for rotation on the attachment plate 14.

As those of skill in the art will appreciate, positioned as they are on the upper surface of the attachment plate 14, the brackets 20 provide an angular range of motion of approximately 90° to the extending arm assemblies 18. In other embodiments, rather than being attached to the upper surface of the attachment plate 14, the brackets 20 may be welded or otherwise fixed to the circumferential side edge of the attachment plate 14, which would provide an angular range of motion of 180° or greater for the extending arm assemblies 18. Fixing the arm assemblies 18 to the side edge of the attachment plate 14 may also allow a reduction in the diameter of the attachment plate 14, for example, from about 18 inches to about 16 inches.

In the illustrated embodiment, there are twelve arm assemblies 18 mounted on the attachment plate 14, although there may be more or fewer arm assemblies 18 in other embodiments. As will be described below in more detail, each of the arm assemblies 18 is a telescoping structure that can take essentially any length within a defined range. In the illustrated embodiment, the fully extended length of an arm assembly 18 may be slightly less than four feet, although any lengths, and particularly any lengths that work with a bale ring, may be used. The minimum length of an arm assembly 18 in the illustrated embodiment may be slightly more than two feet.

Figure 4:
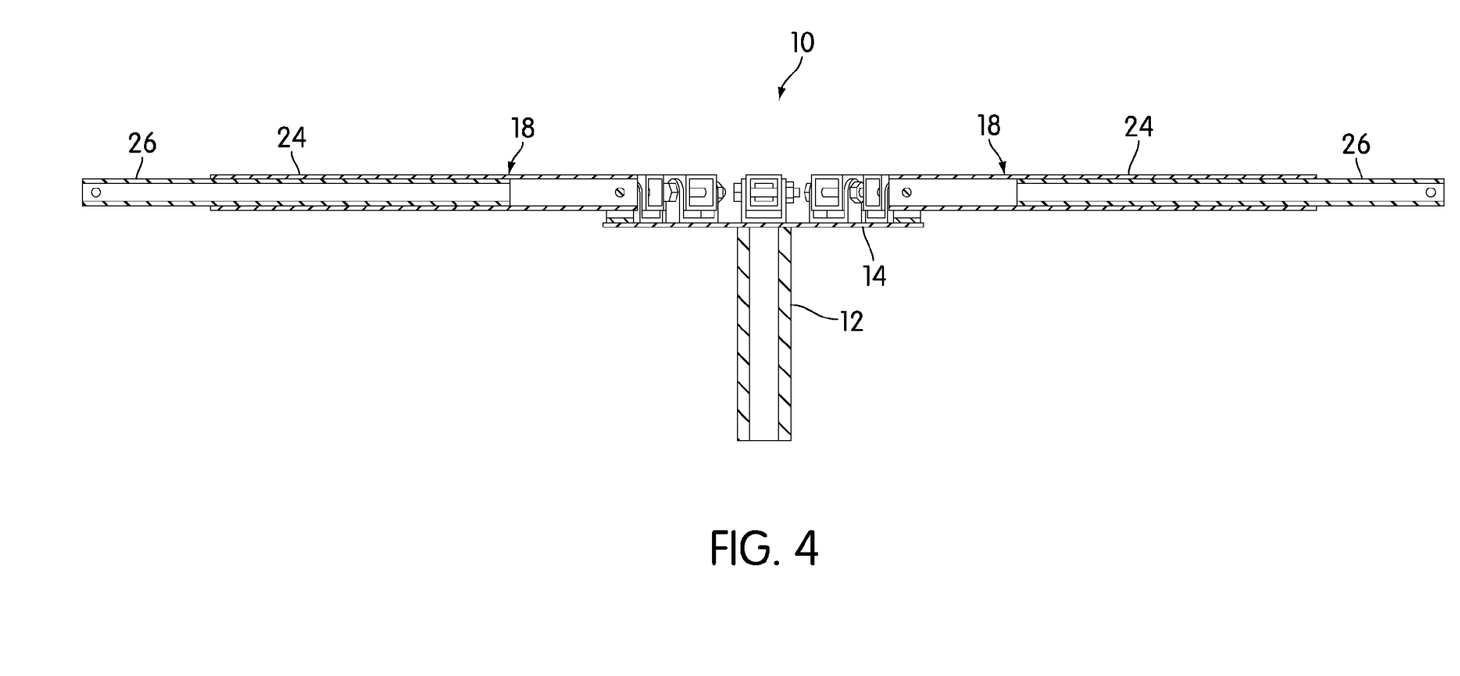
FIG. 4 is a cross-sectional view of the feed support taken through Line 4-4 of FIG. 2.

The arm assemblies 18 telescope, and each may be adjusted to its own arbitrary length, irrespective of the lengths of the other arm assemblies 18. FIG. 4 is a cross-sectional view of the feed support 10 taken through Line 4-4 of FIG. 2, illustrating, among other features, the internal arrangement of two of the arm assemblies 18.

As shown in FIG. 4, each arm assembly 18 includes a primary arm section 24 and a secondary arm section 26. Both the primary and secondary arm sections 24, 26 are comprised of square tubing, and the two sections 24, 26 are dimensioned such that the secondary arm sections 26 fit and slide within the primary arm sections 24, giving the arm assemblies 18 as a whole the ability to telescope. While the secondary arm sections 26 can slide, the primary arm sections 24, for their part, are mounted for rotation on the attachment plate 14 by the brackets 20 and bolts 22, as was described above. Although the arm assemblies 24, 26 are comprised of square tubing, those components may be comprised of round tubing, rectangular tubing, or tubing of other shapes in other embodiments.

Additionally, although the secondary arm sections 26 rest within the primary arm sections 24 in the illustrated embodiment, that need not be the case in all embodiments. Instead, the primary arm sections 24 may rest within the secondary arm sections 26. In other words, it is not critical which of the two arm sections 24, 26 is male and which is female.

Figure 5:
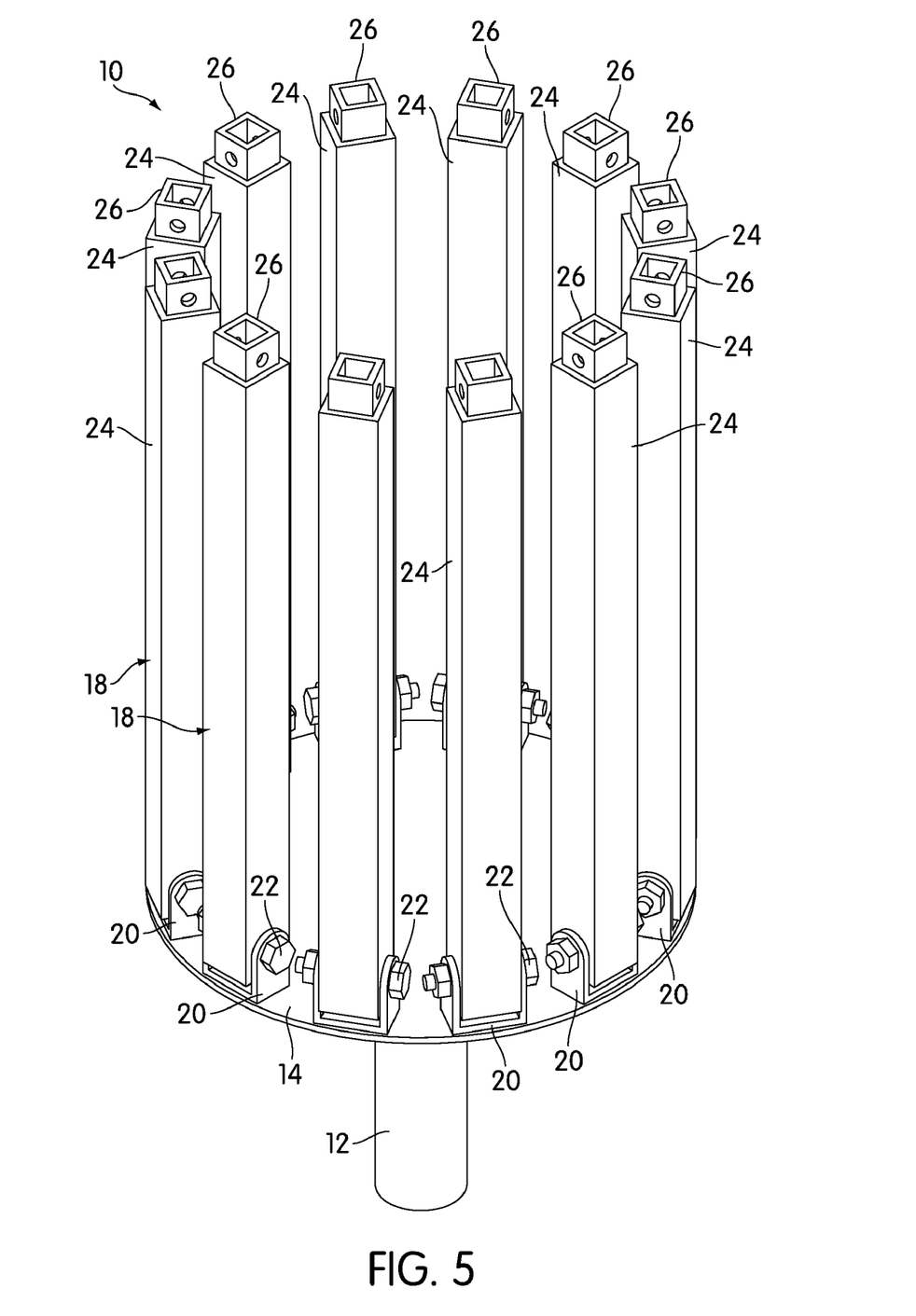
FIG. 5 is a perspective view of the feed support of FIG. 1 with its support arms folded for storage and transport.

FIG. 5 is a perspective view of the feed support 10 with its arm assemblies 18 in a folded, stored configuration. In the folded, stored configuration illustrated in FIG. 5, each of the arm assemblies is folded upward 90° with respect to the position illustrated in FIG. 4, such that the arm assemblies 18 extend perpendicular to the attachment plate 14. Additionally, the secondary arm sections 26 are fully retracted within the primary arm sections 24.

The folded, stored configuration of the feed support 10 allows the feed support to be easily shipped and easily handled prior to installation and use. It also allows the feed support 10 to be easily removed from one bale ring, if necessary, and placed in another. In some embodiments, the feed support 10 may include structure to retain the arm assemblies 18 in the folded, stored configuration or the extended configuration shown in FIG. 4. For example, the arm assemblies 18 may include additional sets of holes through which pins can be inserted to retain the primary and secondary arm sections 24, 26 in the extended and retracted positions.

Figure 6:
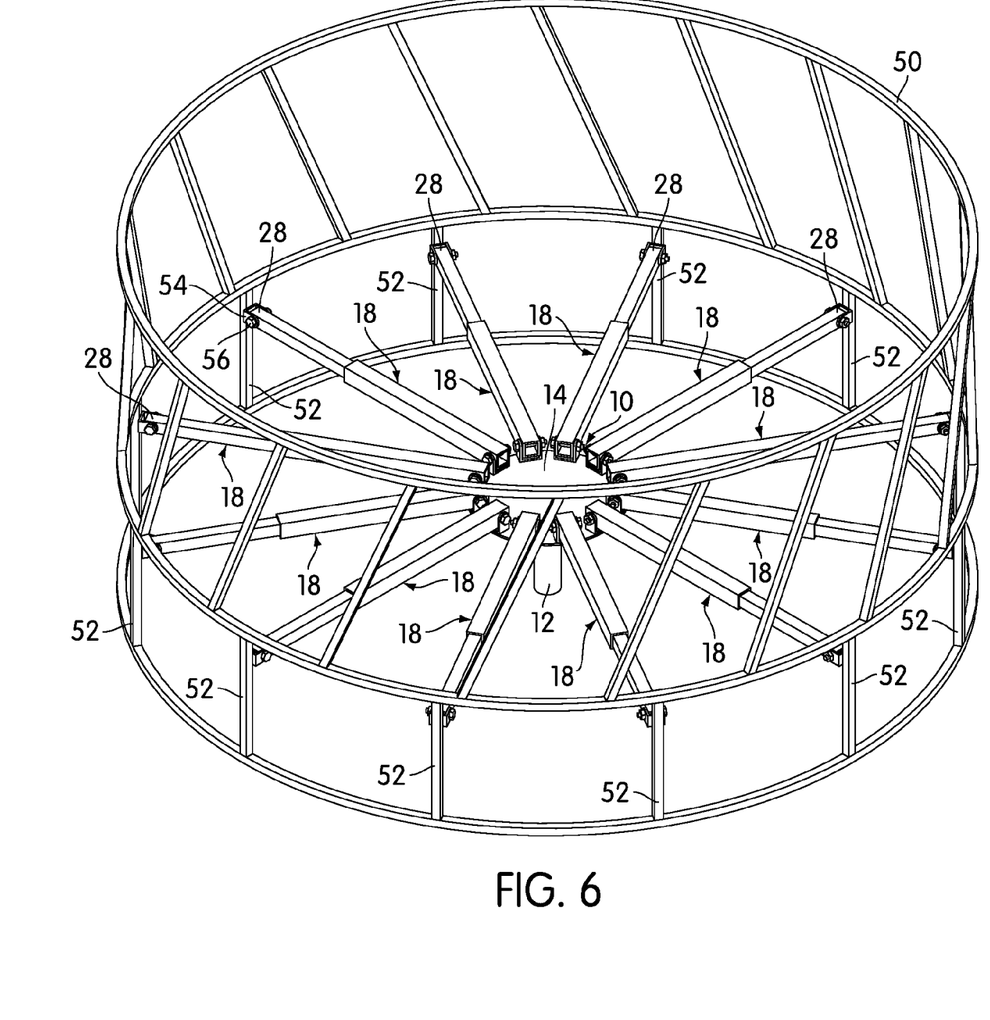
FIG. 6 is a perspective view of the feed support of FIG. 1 as installed in a bale ring.

FIG. 6 is a perspective view of a feed support 10 as installed within a bale ring 50. The feed support 10 is situated within the bale ring 50 such that its support member 12 is at approximately the center of the bale ring 50. The height of the support member 12 gives the attachment plate 14 and arm assemblies 18 a height off the ground of approximately 6-12 inches when the feed support 10 is installed. As shown in FIG. 6, the arm assemblies 18 are extended such that the ends 28 of the secondary arms 26 are connected to upright members 52 of the bale ring 50. Because of the telescoping nature of the arm assemblies 18, the feed support 10 may be used with bale rings 50 having a variety of different diameters.

As shown in FIG. 6, the upright members 52 of the bale ring 50 carry engaging structure to engage the ends 28 of the secondary arm section 26. In the illustrated embodiment, the engaging structure comprises a U-shaped engaging bracket 54 mounted on each upright member 52. A bolt 56 passes through aligned holes in the brackets and in the secondary arm sections to secure the arm assemblies 18 to the bale ring 50.

The attachment of the arm assemblies 18 to the bale ring 50 distributes the load of any feed, such as a bale of hay, that may be supported by the arm assemblies 18, and may help to prevent the arm assemblies 18 from bending under what would otherwise be a cantilevered load. However, it should be understood that in some embodiments, attachment of the arm assemblies 18 to the bale ring 50 may be optional. Whether the arm assemblies 18 are attached to the bale ring 50 or not will generally depend on the weight of feed that is to be supported by the arm assemblies 18, the mechanical properties and load carrying capacity of the arm assemblies 18, the structural integrity and load carrying capacity of the bale ring 50, and other conventional factors.

Moreover, when the arm assemblies 18 are attached to the bale ring 50, that attachment may be made in any way; the engaging structures 54, 56 illustrated in FIG. 6 are but one example. In some embodiments, for example, the secondary arm sections 26 may have forked ends similar to the brackets 54, such that the arm assemblies 18 may be attached to the bale ring 50 simply by drilling appropriately located holes in the upright members 52 and inserting a bolt or pin through the aligned forked ends and the corresponding upright members. More generally, when cooperating engaging structures are used to attach the arm assemblies 18 to the bale ring 50, either piece 18, 50 may carry the male engaging structure and either piece 18, 50 may carry the female engaging structure. Which piece 18, 50 carries which structure may depend, in part, on whether it is possible or convenient to modify the bale ring 50; if it is not possible or convenient to modify the bale ring 50 to any great extent, then the more complex engaging structure may be carried by, or form a part of, the ends 28 of the secondary arm structures 26.

Of course, where attachment of the arm assemblies 18 and the bale ring 50 is desired, that attachment may be by any means known in the art; the structures illustrated in FIG. 6 and described above are but a few examples. In other embodiments, the arm assemblies 18 may be attached to the bale ring 50 by clamping, welding, or any other means. Additionally, the feed support 10 and its arm assemblies 18 may be attached to any part of the bale ring 50; for example, the arm assemblies may be attached to one of the circumferential rings of the bale ring 50, instead of the upright members 52.

Once installed as shown in FIG. 6, structures may be laid over the extended arm assemblies 18 so as to provide a more contiguous support surface for feed. For example, sheet metal, plastic panels, or chain mesh may be laid over the installed feed support 10 and its arm assemblies 18 to ensure that feed can be supported between the arm assemblies 18. Any material laid over the arm assemblies 18 may be secured to the arm assemblies, to the attachment plate, or to both structures by clamping, bolting, tying, or any other conventional technique.

Figure 7:
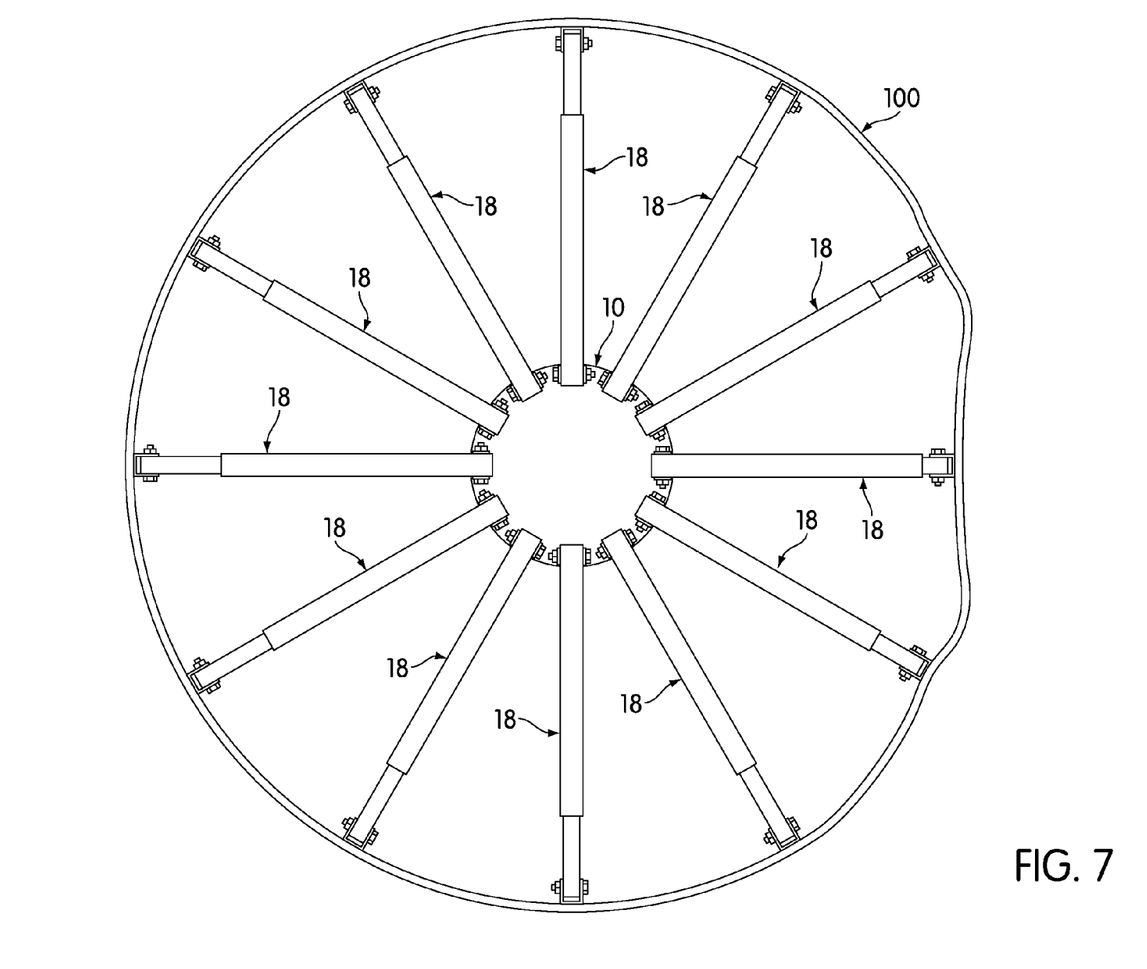
FIG. 7 is a top plan view of the feed support of FIG. 1 in use with a bale ring that has been deformed such that it is no longer round.

FIG. 7 is a top plan view of a feed support 10 installed in a bale ring 100, illustrating an advantage of the feed support 10. Specifically, the bale ring 100 is dented out-of-round on one side. However, the feed support 10 can still fit within and be used inside of the bale ring 100. In order to do so, one simply retracts the secondary arm sections 26 to accommodate the new position of the sidewall of the bale ring 100, as shown in FIG. 6. Thus, the three arm assemblies 18 that extend into the dented portion of the bale ring 100 are simply shorter than the other arm assemblies 18.

Figure 8:
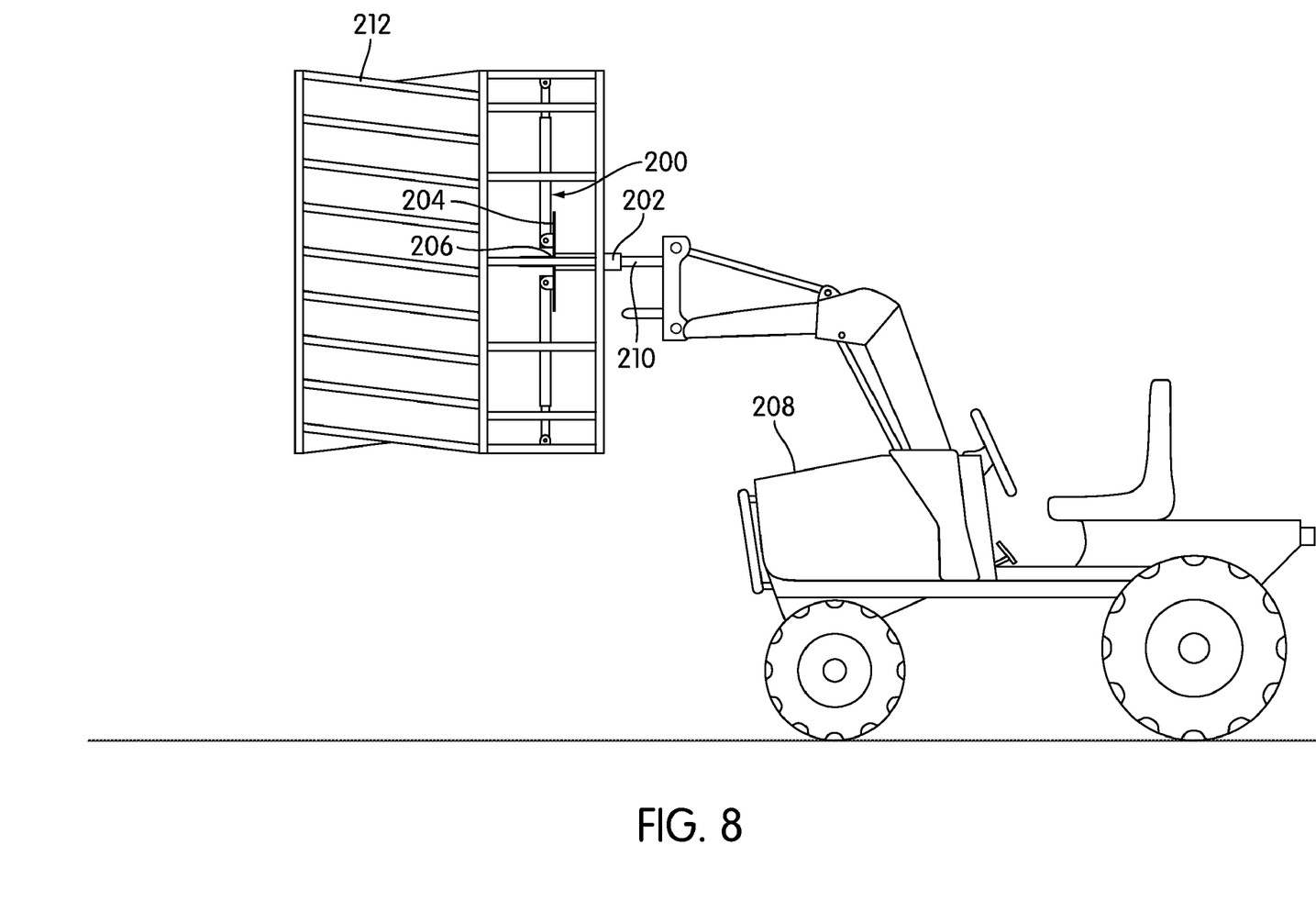
FIG. 8 is a side elevational view of another embodiment of the feed support being used as a bale ring mover within a bale ring.

In FIGS. 1-7 the feed support 10 was used in a fixed position within a bale ring. However, in other embodiments of the invention, feed supports may be used as bale ring movers. FIG. 8 is a side elevational view of a bale ring mover-feed support, generally indicated at 200, according to another embodiment. As compared with the feed support 10, the bale ring mover-feed support 200 has a hollow support member 202 and an attachment plate 204 with an opening 206. The hollow support member 202 and attachment plate 204 with an opening 206 allow a tractor 208 with a hay spear 210 to pick up the bale ring mover-feed support 200. As shown in the view of FIG. 8, the bale ring mover-feed support 200 is mounted within a bale ring 212, and the tractor 208 has used its spear 210 to pick up the assembly 200, 212.

In practice, the assembly 200, 212 may be picked up on its side, oriented vertically as in FIGS. 1-7, or in any other position that can be accessed by the tractor 208 and its hay spear 210. Any hay or other animal feed that may be present within the bale ring 212 may also be picked up and moved with the assembly 200, 212. In some embodiments, an entire bale of hay could be positioned within the assembly 200, 212 and picked up by the tractor 208 along with the assembly 200, 212, although in most embodiments, operators will pick up only the empty or substantially empty assembly 200, 212 as a means of relocating the bale ring 212.

Figure 9:
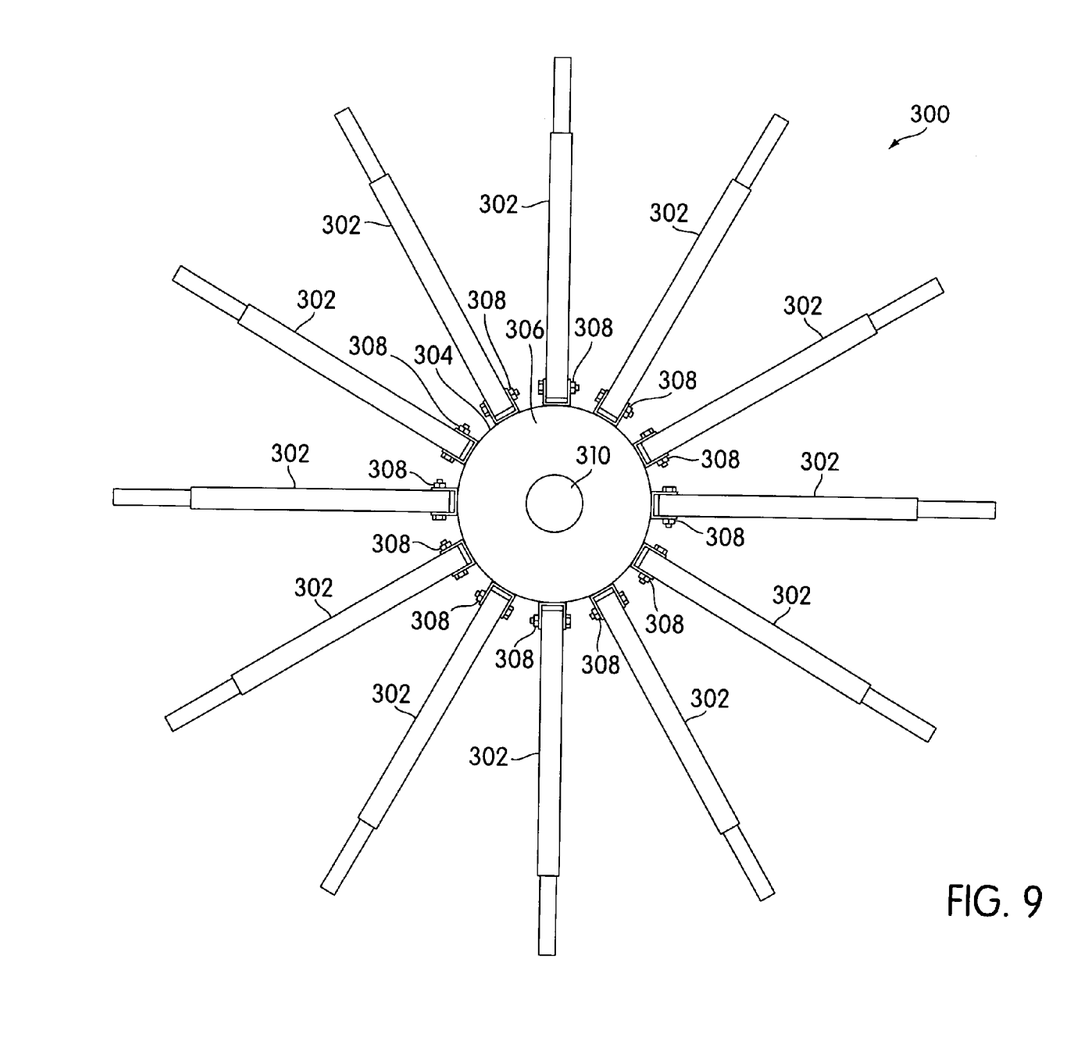
FIG. 9 is a top plan view of another embodiment of the feed support in which arm assemblies are secured to the side edge of the attachment plate.

FIG. 9 is a top plan view of another embodiment of a feed support, generally indicated at 300. In the feed support 300, a plurality of arm assemblies 302 are attached to the circumferential side edge 304 of the attachment plate 306 by U-brackets 308, as was described briefly above. Additionally, the attachment plate 306 has a central opening 310.

In the above description, certain dimensions and exemplary materials for the components have been given. The height, width, diameter, thickness, materials, and mechanical properties of the various components may differ from embodiment to embodiment and installation to installation. Generally, the materials of which a component is made and its dimensions will depend on factors such as the weight of the feed that is to be supported, the type of animals that are to feed, the strength, rigidity, and other properties of the bale ring with which the feed support 10 or bale ring mover-feed support 200 is to be used, and any other conventional factors.

While the invention has been described with respect to certain embodiments, the description is intended to be exemplary, rather than limiting. Modifications and changes may be made within the scope of the invention, which is defined by the appended claims.

What is claimed is:

1. A feed support and bale ring mover, comprising:
an elongate, generally straight support member;
an attachment plate fixed to an upper end of the support member in a generally horizontal orientation; and
a plurality of arm assemblies rotatably attached to an outer portion of the attachment plate, the attachment of the arm assemblies to the attachment plate being such that they can be rotated between a stored position in which the arm assemblies extend essentially perpendicular to the attachment plate and parallel to the support member, and an extended position in which the arm assemblies extend generally parallel to and radially outward from the attachment plate, each of the plurality of arm assemblies including
a primary arm section that is rotatably attached to the attachment plate by a connecting bracket having a pair of projecting elements spaced from one another, the pair of projecting elements having aligned holes with a fastener passing through the aligned holes in the projecting elements and corresponding aligned holes in the primary arm section to mount the primary arm section for rotation about the attachment plate, and
a secondary arm section mounted relative to the primary arm section so as to provide telescopic sliding movement between extended and retracted positions so as to vary the overall length of the arm assembly.

2. The feed support and bale ring mover of claim 1, wherein the attachment plate is generally circular in shape.

3. The feed support and bale ring mover of claim 1, wherein ends of the secondary arm sections carry complementary engaging structures for engaging the feed support to a bale ring.

4. The feed support and bale ring mover of claim 1, wherein the primary and secondary arm sections comprise sections of square or rectangular tubing.

5. The feed support and bale ring mover of claim 1, wherein:
the support member further comprises an open, central channel and is open on both ends; and
the attachment plate comprises a central opening that corresponds in position to the central channel of the support member.

6. The feed support and bale ring mover of claim 1, wherein each of the plurality of arm assemblies is mounted on an upper surface of the attachment plate around the perimeter thereof.

7. The feed support and bale ring mover of claim 1, wherein the connecting brackets connecting the plurality of arm assemblies to the attachment plate are connected to an outer side edge of the attachment plate, such that the plurality of arm assemblies extend from the outer side edge of the attachment plate.

8. A system for feeding animals, comprising:
a generally cylindrical bale ring, at least a portion of the outer circumference of the bale ring being defined by slanted bars spaced from one another that define animal feeding positions; and
a feed support sized and dimensioned to fit within the circumference of the bale ring, including
an elongate, generally straight support member,
an attachment plate fixed to an end of the support member in an orientation generally perpendicular to the end of the support member, and
a plurality of arm assemblies pivotably attached to the attachment plate around an outer portion thereof, the attachment of the arm assemblies to the attachment plate being such that they can be pivoted at least between a stored position in which the arm assemblies extend essentially perpendicular to the attachment plate and parallel to the support member, and an extended position in which the arm assemblies extend generally parallel to and radially outward from the attachment plate, each of the plurality of arm assemblies including
a primary arm section that is rotatably attached to the attachment plate, and
a secondary arm section mounted relative to the primary arm section so as to provide telescopic sliding movement between extended and retracted positions so as to vary the overall length of the arm assembly.

9. The animal feeding system of claim 8, wherein ends of the secondary arms carry engaging structure for attaching the arm assemblies to the inner circumference of the bale ring.

10. The animal feeding system of claim 8, wherein ends of the secondary arms are attached to the inner circumference of the bale ring.

11. The animal feeding system of claim 10, wherein the ends of the secondary arm sections carry complementary engaging structures for engaging the feed support to the inner circumference of the bale ring.

12. The animal feeding system of claim 8, wherein the attachment plate is generally circular in shape.

13. The animal feeding system of claim 8, wherein each of the plurality of arm assemblies is attached to the attachment plate by a bracket that defines a generally horizontal axis of rotation for its respective arm assembly.

14. The animal feeding system of claim 8, wherein the primary and secondary arm sections comprise sections of square or rectangular tubing.

15. The system of claim 8, wherein each of the plurality of arm assemblies is attached to an outer side edge of the attachment plate.

16. A method of moving a bale ring, comprising:
providing a feed support and bale ring mover including
a generally cylindrical bale ring, at least a portion of the outer circumference of the bale ring being defined by slanted bars spaced from one another; and
a feed support sized and dimensioned to fit within the circumference of the bale ring, including
an elongate, generally straight support member, the support member being open at both ends and having an open axial channel extending therethrough,
an attachment plate fixed to an end of the support member in an orientation generally perpendicular to the end of the support member, the attachment plate including an opening corresponding to the position of the axial channel in the support member, and
a plurality of arm assemblies pivotably attached to the attachment plate around an outer portion thereof, the attachment of the arm assemblies to the attachment plate being such that the arm assemblies can be pivoted at least between a stored position in which the arm assemblies extend essentially perpendicular to the attachment plate and parallel to the support member, and an extended position in which the arm assemblies extend generally parallel to and radially outward from the attachment plate, each of the plurality of arm assemblies including
a primary arm section that is rotatably attached to the attachment plate, and
a secondary arm section mounted relative to the primary arm section so as to provide telescopic sliding movement between extended and retracted positions so as to vary the overall length of each of the plurality of arm assemblies;
inserting a spear through the axial channel in the support member and the opening in the attachment plate; and
moving the feed support and bale ring mover.

* * * * *